United States Patent

Fujinaga et al.

(10) Patent No.: US 6,599,854 B2
(45) Date of Patent: Jul. 29, 2003

(54) DIELECTRIC CERAMIC COMPOSITION

(75) Inventors: Masataka Fujinaga, Yamaguchi (JP); Koichi Fukuda, Yamaguchi (JP)

(73) Assignee: UBE Electronics Ltd., Yamaguchi (JP)

( * ) Notice: Subject to any disclaimer, the term of this patent is extended or adjusted under 35 U.S.C. 154(b) by 264 days.

(21) Appl. No.: 09/843,373

(22) Filed: Apr. 26, 2001

(65) Prior Publication Data

US 2001/0056031 A1 Dec. 27, 2001

(30) Foreign Application Priority Data

Apr. 27, 2000 (JP) ........................................ 2000-126929
Feb. 26, 2001 (JP) ........................................ 2001-050873

(51) Int. Cl.⁷ ............................................. C04B 35/465
(52) U.S. Cl. ........................................................ 501/136
(58) Field of Search ......................................... 501/136

(56) References Cited

U.S. PATENT DOCUMENTS 4,670,409 A    6/1987    Okawa et al. .............. 501/136
5,356,844 A    10/1994   Hirahara et al. ............ 501/136
6,403,512 B1 * 6/2002    Ishikawa et al. ............ 501/136

* cited by examiner

*Primary Examiner*—David Brunsman
(74) *Attorney, Agent, or Firm*—Anderson Kill & Olick, P.C.; Eugene Lieberstein; Michael N. Meller

(57) ABSTRACT

A dielectric ceramic composition comprising a first compound having the general formula, $aCaTiO_3—(1-a)Ca(Al_{1/2}Nb_{1/2})O_3$ in which $0.4 \leq a \leq 0.6$.

Preferably, it further contains a second compound selected from the group consisting of zirconium oxide ($ZrO_2$), manganese oxide ($MnO_2$) and antimony trioxide ($Sb_2O_3$), with the second compound present in an amount no more than 2 parts by weight relative to 100 parts by weight of the first compound.

10 Claims, 1 Drawing Sheet

DIELECTRIC CERAMIC COMPOSITION

BACKGROUND OF THE INVENTION

1. Field of the Invention

The present invention relates to a dielectric ceramic composition comprising calcium, titanium, aluminium, niobium and oxygen, which is favorable for dielectric resonators for use in a microwave region of a few GHz zone.

The dielectric ceramic composition of the invention is used not only for dielectric resonators but also for substrates for microwave ICs, dielectric control rods, etc.

2. Description of the Related Art

With the recent tendency in the art toward highly integrated microwave circuits, desired are small-sized high-performance dielectric resonators for them. The requirements of dielectric ceramic compositions for such dielectric resonators are that their relative dielectric constant $\epsilon_r$ is large, that the absolute value of the temperature coefficient $\tau_f$ of resonance frequency is small and stable, and that their unloaded Q is large.

Some dielectric ceramic compositions essentially comprising $TiO_2$, $BaO$—$TiO_2$ or the like are known, but they are difficult to industrialize as their temperature coefficient is large and their dielectric loss in a microwave zone is large.

Other dielectric ceramic compositions having a perovskite structure of, for example, $Ba(Mg_{1/3}Ta_{2/3})O_3$, $Ba(Zn_{1/3}Ta_{2/3})O_3$, $Ba(Zn_{1/3}Nb_{2/3})O_3$ or the like are known, but their dielectric constant is small. Therefore, for example, when they are formed into resonators usable in a microwave zone of from 0.1 to 5 GHz, the size of the resonators is inevitably large.

One object of the present invention is to provide a dielectric ceramic composition favorable for dielectric resonators, especially for those for use in a microwave zone of from 0.1 to 5 GHz.

Another object of the invention is to provide a dielectric ceramic composition having a high dielectric constant $\epsilon_r$, a high Q value, and a small and stable absolute value of the temperature coefficient $\tau_f$ of resonance frequency.

SUMMARY OF THE INVENTION

We, the present inventors have found that, of many constituent elements used in dielectric ceramic compositions, a specific ceramic composition comprising a combination of calcium, titanium, aluminium, niobium and oxygen attains the above-mentioned objects, and have completed the present invention.

Specifically, the invention provides a dielectric ceramic composition comprising a first compound of a general formula, $aCaTiO_3$—$(1-a)Ca(Al_{1/2}Nb_{1/2})O_3$ with $0.4 \leq a \leq 0.6$.

The invention also provides a dielectric ceramic composition comprising the first compound as above and containing, as a second compound, at least one of zirconium oxide ($ZrO_2$), manganese oxide ($MnO_2$) and antimony trioxide ($Sb_2O_3$), in which the amount of the second compound is at most 2 parts by weight relative to 100 parts by weight of the first compound.

DETAILED DESCRIPTION OF THE INVENTION

Figure 1:
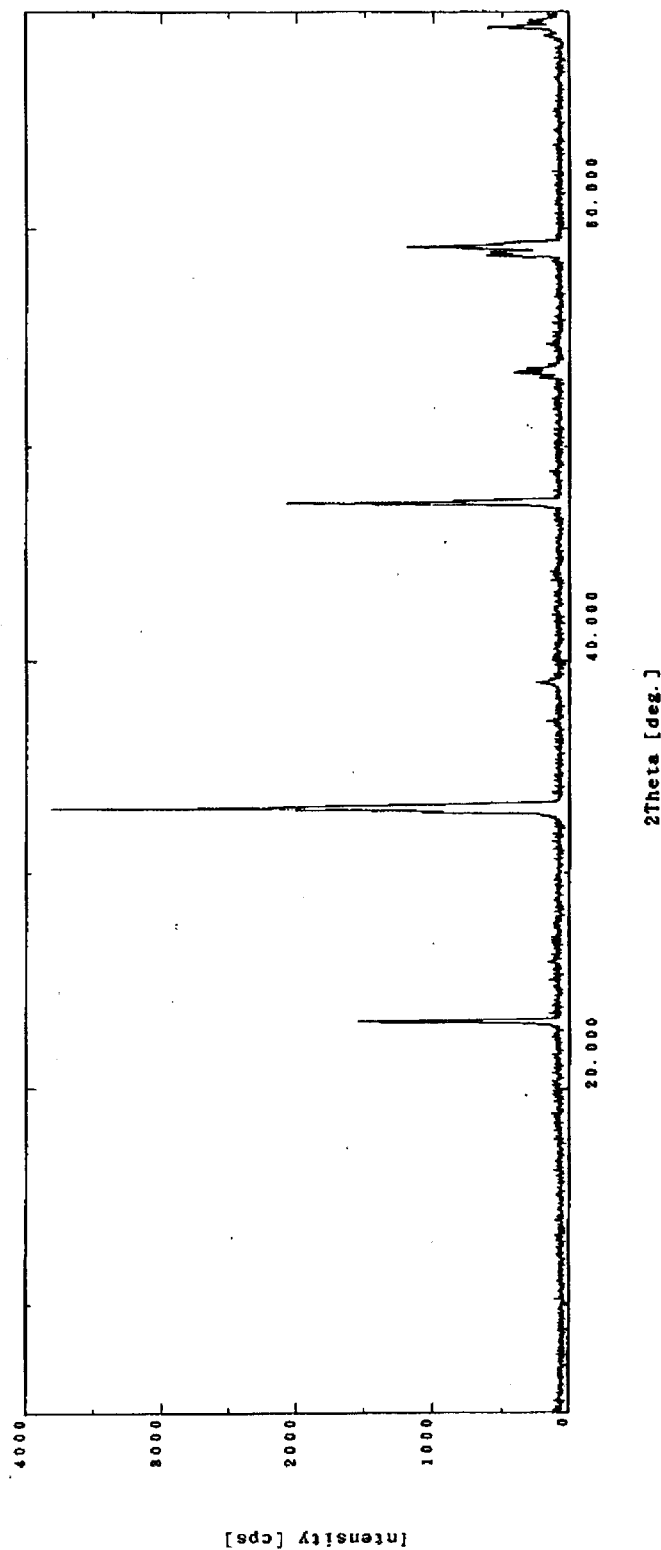
FIG. 1 is an X-ray diffraction pattern of one example of the dielectric ceramic composition of the invention.

The dielectric ceramic composition of the invention comprises a first compound of a general formula, $aCaTiO_3$—$(1-a)Ca(Al_{1/2}Nb_{1/2})O_3$ with $0.4 \leq a \leq 0.6$. The composition has a large relative dielectric constant, and therefore can be formed into small-sized resonators having the advantages of large unloaded Q and small temperature coefficient $\tau_f$ of resonance frequency.

Preferably, the dielectric ceramic composition of the invention contains, as a second compound, at most 2 parts by weight, relative to 100 parts by weight of the first compound therein, of at least one of zirconium oxide ($ZrO_2$), manganese oxide ($MnO_2$) and antimony trioxide ($Sb_2O_3$). More preferably, the second compound content of the composition falls between 0.2 and 2 parts by weight. Containing the second compound, the unloaded Q of the composition is greatly increased.

The first compound of the dielectric ceramic composition of the invention is a composite oxide containing metal elements of Ca, Ti, Al and Nb. The constitution of the first compound is specifically defined as above, and the reason for it is as follows:

In the formula that represents the first compound, $0.4 \leq a \leq 0.6$. If a is too large, $\tau_f$ of the dielectric ceramic composition increases on the positive side, and is over 50 ppm/° C. On the other hand, if a is too small, the dielectric constant of the composition lowers, and $\tau_f$ thereof increases on the negative side to overstep −50 ppm/° C.

The second compound of the dielectric ceramic composition of the invention is at least one of zirconium oxide, manganese oxide and antimony trioxide. The additives to be the second compound may be zirconium oxide ($ZrO_2$), manganese oxide ($MnO_2$) and antimony trioxide ($Sb_2O_3$) themselves, but may also be zinc, manganese and antimony carbonates and hydroxides capable of being converted into their oxides during the firing process. Regarding the amount of the second compound that may be in the composition, the additives may be added to the composition so that they satisfy the range of the second compound defined herein in terms of zirconium oxide ($ZrO_2$), manganese oxide ($MnO_2$) and antimony trioxide ($Sb_2O_3$). The reason why the second compound content of the composition is defined as above is because, if the second compound content is too much larger than 2 parts by weight, the unloaded Q of the composition may lowers.

One preferred example of the method for producing the dielectric ceramic composition of the invention is described below.

Starting materials of calcium carbonate, titanium oxide, aluminium oxide and niobium oxide are mixed in wet in a predetermined ratio, along with a solvent such as water or alcohol. Next, the solvent such as water or alcohol is removed from the mixture, then the dry mixture is ground and calcined in an oxygen-containing gas atmosphere (for example, in air) at 1000 to 1300° C. for about 2 to 10 hours. The resulting calcined powder is further ground, then mixed and homogenized along with an organic binder such as polyvinyl alcohol, dried, still ground, and thereafter shaped under pressure (100 to 1000 kg/cm²). The thus-shaped cake is fired in an oxygen-containing gas atmosphere such as air at 1350 to 1650° C. to give a dielectric ceramic composition having the above-mentioned compositional formula.

A dielectric ceramic composition containing an additive of any of zirconium oxide, manganese oxide and antimony trioxide may be produced as follows: The additive is added to the calcined powder prepared in the manner as above, and then mixed in wet along with a solvent such as water or alcohol. Next, the solvent such as water or alcohol is removed from the mixture, and the dry mixture is further mixed and homogenized along with an organic binder such as polyvinyl alcohol, dried, still ground, and thereafter shaped under pressure (100 to 1000 kg/cm$^2$). The thus-shaped cake is fired in an oxygen-containing gas atmosphere such as air at 1350 to 1650° C. to give a dielectric ceramic composition having the above-mentioned compositional formula and containing the additive.

The dielectric ceramic composition thus obtained in the manner as above is, directly or optionally after processed into a shaped body having a desired size, used as a material for dielectric resonators, dielectric substrates for microwave ICs, dielectric control rods, etc. In particular, the composition exhibits an excellent effect when formed into dielectric resonators for use in a zone of from 0.1 to 5 GHz.

For the starting materials for calcium, titanium, aluminium and niobium, usable are $CaCO_3$, $TiO_2$, $Al_2O_3$, $Nb_2O_6$, and also carbonates and hydroxides that may be converted into oxides during firing process. In the composition of $aCaTiO_3$—$(1-a)Ca(Al_{1/2}Nb_{1/2})O_3$ in which $0.4 \leq a \leq 0.6$, even when the amount of some constituent elements increases or decreases in some degree, or even when some constituent elements are partly substituted with any other elements, or even when some additives are added to the composition, the resulting compositions still have the same perovskite structure and exhibit the same effect.

EXAMPLES

The invention is described more concretely with reference to the following Examples, which, however, are not intended to restrict the scope of the invention.

Example 1

[Sample No. 1]

Calcium carbonate ($CaCO_3$) powder, titanium oxide ($TiO_2$) powder, aluminium oxide ($Al_2O_3$) powder and niobium oxide ($Nb_2O_5$) powder were put into a ball mill along with ethanol, and mixed in wet for 12 hours. The solvent, ethanol was removed from the resulting mixture, which was then ground for 1 hour in a grinder and calcined at 1200° C. for 5 hours to obtain a calcined powder of $0.6CaTiO_3$—$0.4Ca(Al_{1/2}Nb_{1/2})O_3$.

Next, a suitable amount of polyvinyl alcohol solution was added to the calcined powder and uniformly mixed, and the resulting mixture was pelletized into pellets having a diameter of 10 mm$\phi$ and a thickness of 4 mmt. Then, the pellets were fired and sintered in an air atmosphere at 1500° C. for 2 hours to be a dielectric ceramic composition of the invention.

The thus-obtained ceramic composition was cut into pieces having a suitable size. The pieces were tested according to a dielectric resonance method, and the unloaded Q and the relative dielectric constant $\epsilon_r$ at a resonance frequency $f_0$ (4 to 6 GHz) of the composition were obtained.

Regarding the temperature dependency of the resonance frequency of the composition, the pieces were measured at different temperatures falling between −40 and 80° C., and the temperature coefficient $\tau_f$ of the composition was obtained. The data obtained are given in Table 1.

The dielectric ceramic composition obtained herein was analyzed through X-ray diffractometry, and was found having a composite perovskite structure of $0.6CaTiO_3$—$0.4Ca(Al_{1/2}Nb_{1/2})O_3$. FIG. 1 shows the X-ray diffraction pattern of the composition.

TABLE 1

| No. | $CaTiO_3$ A | $Ca(Al_{1/2}Nb_{1/2})O_3$ 1-a | $\epsilon_r$ | $f_0Q$ | $\tau_f$ (ppm/° C.) |
|---|---|---|---|---|---|
| 1 | 0.60 | 0.40 | 57.3 | 33000 | 42.5 |
| 2 | 0.58 | 0.42 | 55.1 | 35000 | 31.2 |
| 3 | 0.55 | 0.45 | 53.5 | 37000 | 20.5 |
| 4 | 0.53 | 0.47 | 51.6 | 39500 | 11.2 |
| 5 | 0.52 | 0.48 | 50.5 | 41000 | 4.2 |
| 6 | 0.50 | 0.50 | 48.4 | 41200 | −4.9 |
| 7 | 0.49 | 0.51 | 47.0 | 41000 | −8.5 |
| 8 | 0.48 | 0.52 | 46.1 | 40900 | −11.0 |
| 9 | 0.46 | 0.54 | 44.9 | 40700 | −15.1 |
| 10 | 0.45 | 0.55 | 44.2 | 41000 | −17.6 |
| 11 | 0.44 | 0.56 | 43.8 | 40800 | −20.2 |
| 12 | 0.42 | 0.58 | 41.5 | 40500 | −29.5 |
| 13 | 0.40 | 0.60 | 40.6 | 39000 | −37.6 |
| *14 | 0.70 | 0.30 | 71.7 | 28000 | 129.8 |
| *15 | 0.30 | 0.70 | 36.2 | 40000 | −56.1 |

[Samples No. 2 to No. 15]

Dielectric ceramic compositions were produced in the same manner as that for sample No. 1, except that the blend ratio of calcium carbonate, titanium oxide, aluminium oxide and niobium oxide was varied, and these were tested also in the same manner for their characteristics.

The data obtained are in Table 1, in which the samples marked with * are comparative samples not falling within the scope of the invention.

As is obvious from Table 1, the dielectric ceramic composition of the invention has excellent characteristic properties such as a relative dielectric constant of larger than 40, an $f_0Q$ value of not smaller than 33000, and $\tau_f$ falling within a range of ±50 ppm/° C. However, the dielectric ceramic composition not falling within the scope of the invention have a low dielectric constant or a low $f_0Q$ value, and the absolute value of their $\tau_f$ is over 50.

[Sample No. 16]

Calcium carbonate ($CaCO_3$) powder, titanium oxide ($TiO_2$) powder, aluminium oxide ($Al_2O_3$) powder and niobium oxide ($Nb_2O_5$) powder were put into a ball mill along with ethanol, and mixed in wet for 12 hours. The solvent, ethanol was removed from the resulting mixture, which was then ground for 1 hour in a grinder, and calcined at 1200° C. for 5 hours to obtain a calcined powder of $0.6CaTiO_3$—$0.4Ca(Al_{1/2}Nb_{1/2})O_3$. The resulting calcined powder was put into a ball mill along zirconium oxide ($ZrO_2$) powder and ethanol, and mixed in wet for 12 hours. The solvent, ethanol was removed from the resulting mixture, which was then ground for 1 hour in a grinder.

Next, a suitable amount of polyvinyl alcohol solution was added to the calcined powder and uniformly mixed, and the resulting mixture was pelletized into pellets having a diameter of 10 mm$\phi$ and a thickness of 4 mmt. Then, the pellets were fired and sintered in an air atmosphere at 1500° C. for 2 hours to be a dielectric ceramic composition of the invention.

The thus-obtained ceramic composition was cut into pieces having a suitable size. The pieces were tested according to a dielectric resonance method, and the unloaded Q and the relative dielectric constant $\epsilon_r$ at a resonance frequency $f_0$ (4 to 6 GHz) of the composition were obtained.

Regarding the temperature dependency of the resonance frequency of the composition, the pieces were measured at different temperatures falling between −40 and 80° C., and the temperature coefficient $\tau_f$ of the composition was obtained. The data obtained are given in Table 2.

[Samples No. 17 to No. 26]

Dielectric ceramic compositions were produced in the same manner as that for sample No. 16, except that the blend ratio of calcium carbonate, titanium oxide, aluminium oxide, niobium oxide and zirconium oxide was varied, and these were tested also in the same manner for their characteristics.

The data obtained are in Table 2.

As is obvious from Table 1 and Table 2, the dielectric ceramic composition of the invention has excellent characteristic properties such as a relative dielectric constant of larger than 40, an $f_0Q$ value of not smaller than 33000, and $\tau_f$ falling within a range of ±50 ppm/° C. The $f_0Q$ value of the dielectric ceramic composition containing the additive $ZrO_2$ increased. However, adding too much the additive to the dielectric ceramic composition did not improve the characteristics of the dielectric ceramic composition.

TABLE 2

| No. | CaTiO$_3$ a | Ca(Al$_{1/2}$Nb$_{1/2}$)O$_3$ 1-a | ZrO$_2$ (wt. pts.) | $\epsilon_r$ | $f_0Q$ | $\tau_f$ (ppm/° C.) |
|---|---|---|---|---|---|---|
| 16 | 0.60 | 0.40 | 0.2 | 57.5 | 34000 | 43.0 |
| 17 | 0.60 | 0.40 | 0.7 | 58.3 | 37000 | 46.5 |
| 18 | 0.60 | 0.40 | 2 | 59.4 | 36000 | 49.3 |
| 19 | 0.55 | 0.45 | 0.7 | 54.2 | 41500 | 24.3 |
| 20 | 0.50 | 0.50 | 0.2 | 48.6 | 42500 | −3.0 |
| 21 | 0.50 | 0.50 | 0.7 | 49.2 | 45000 | 0.5 |
| 22 | 0.50 | 0.50 | 2 | 50.4 | 44000 | 5.0 |
| 23 | 0.45 | 0.55 | 0.7 | 45.3 | 44500 | −11.2 |
| 24 | 0.40 | 0.60 | 0.2 | 41.0 | 40500 | −35.0 |
| 25 | 0.40 | 0.60 | 0.7 | 41.7 | 43000 | −29.5 |
| 26 | 0.40 | 0.60 | 2 | 42.5 | 42100 | −25.2 |

[Samples No. 27 to No. 31]

Dielectric ceramic compositions were produced in the same manner as that for sample No. 16, except that they contained a second compound, manganese oxide ($MnO_2$), and that the blend ratio of calcium carbonate, titanium oxide, aluminium oxide, niobium oxide and manganese oxide was varied. These were tested also in the same manner for their characteristics.

In producing these, manganese carbonate ($MnCO_3$) and not manganese oxide ($MnO_2$) was added to the calcined mixture. The additive content of the compositions is in terms of manganese oxide ($MnO_2$).

The data obtained are given in Table 3.

As is obvious from Table 1 and Table 3, the dielectric ceramic composition of the invention has excellent characteristic properties such as a relative dielectric constant of larger than 40, an $f_0Q$ value of not smaller than 33000, and $\tau_f$ falling within a range of ±50 ppm/° C. The $f_0Q$ value of the dielectric ceramic composition containing the additive $MnO_2$ increased. However, adding too much the additive to the dielectric ceramic composition did not improve the characteristics of the dielectric ceramic composition.

TABLE 3

| No. | CaTiO$_3$ a | Ca(Al$_{1/2}$Nb$_{1/2}$)O$_3$ 1-a | MnO$_2$ (wt. pts.) | $\epsilon_r$ | $f_0Q$ | $\tau_f$ (ppm/° C.) |
|---|---|---|---|---|---|---|
| 27 | 0.60 | 0.40 | 0.7 | 58.1 | 36000 | 45.5 |
| 28 | 0.50 | 0.50 | 0.2 | 48.4 | 42000 | −2.5 |
| 29 | 0.50 | 0.50 | 0.7 | 49.1 | 44000 | 0.3 |
| 30 | 0.50 | 0.50 | 2 | 50.3 | 42500 | 4.5 |
| 31 | 0.40 | 0.60 | 0.7 | 41.5 | 42500 | −28.5 |

[Samples No. 32 to No. 36]

Dielectric ceramic compositions were produced in the same manner as that for sample No. 16, except that they contained a second compound, antimony oxide, and that the blend ratio of calcium carbonate, titanium oxide, aluminium oxide, niobium oxide and antimony oxide was varied. These were tested also in the same manner for their characteristics.

The data obtained are given in Table 4.

As is obvious from Table 1 and Table 4, the dielectric ceramic composition of the invention has excellent characteristic properties such as a relative dielectric constant of larger than 40, an $f_0Q$ value of not smaller than 33000, and $\tau_f$ falling within a range of ±50 ppm/° C. The $f_0Q$ value of the dielectric ceramic composition containing the additive antimony oxide increased. However, adding too much the additive to the dielectric ceramic composition did not improve the characteristics of the dielectric ceramic composition.

TABLE 4

| No. | CaTiO$_3$ a | Ca(Al$_{1/2}$Nb$_{1/2}$)O$_3$ 1-a | Sb$_2$O$_3$ (wt. pts.) | $\epsilon_r$ | $f_0Q$ | $\tau_f$ (ppm/° C.) |
|---|---|---|---|---|---|---|
| 32 | 0.60 | 0.40 | 0.7 | 58.8 | 37500 | 48.5 |
| 33 | 0.50 | 0.50 | 0.2 | 49.1 | 43000 | −1.5 |
| 34 | 0.50 | 0.50 | 0.7 | 49.8 | 45100 | 1.6 |
| 35 | 0.50 | 0.50 | 2 | 50.9 | 42500 | 6.0 |
| 36 | 0.40 | 0.60 | 0.7 | 42.1 | 43500 | −28.2 |

[Samples No. 37 to No. 45]

Dielectric ceramic compositions were produced in the same manner as that for sample No. 16, except that they contained second compounds, any of zirconium oxide, manganese oxide and antimony oxide, and that the blend ratio of calcium carbonate, titanium oxide, aluminium oxide, niobium oxide zirconium oxide, manganese oxide and antimony oxide was varied. These were tested also in the same manner for their characteristics.

The data obtained are given in Table 5.

As is obvious from Table 1 and Table 5, the dielectric ceramic composition of the invention has excellent characteristic properties such as a relative dielectric constant of larger than 40, an $f_0Q$ value of not smaller than 33000, and $\tau_f$ falling within a range of ±50 ppm/° C. The $f_0Q$ value of the dielectric ceramic composition containing any of the additives, zirconium oxide, manganese oxide and antimony oxide increased. However, adding too much the additives to the dielectric ceramic composition did not improve the characteristics of the dielectric ceramic composition.

TABLE 5

| No. | CaTiO$_3$ a | Ca(Al$_{1/2}$Nb$_{1/2}$)O$_3$ 1-a | ZrO$_2$ (wt. pts.) | MnO$_2$ (wt. pts.) | Sb$_2$O$_3$ (wt. pts.) | $\epsilon_r$ | f$_0$Q | $\tau_f$ (ppm/° C.) |
|---|---|---|---|---|---|---|---|---|
| 37 | 0.60 | 0.40 | 0.7 | 0.7 | 0 | 58.1 | 39500 | 45.5 |
| 38 | 0.60 | 0.40 | 0.7 | 0 | 0.7 | 58.3 | 40000 | 46.5 |
| 39 | 0.50 | 0.50 | 0.1 | 0.1 | 0 | 48.4 | 45000 | −3.5 |
| 40 | 0.50 | 0.50 | 0.7 | 0.7 | 0 | 49.0 | 47500 | −0.5 |
| 41 | 0.50 | 0.50 | 1 | 1 | 0 | 50.2 | 47000 | 4.0 |
| 42 | 0.50 | 0.50 | 0.1 | 0 | 0.1 | 48.6 | 45500 | −3.2 |
| 43 | 0.50 | 0.50 | 1 | 0 | 1 | 50.3 | 46000 | 4.5 |
| 44 | 0.40 | 0.60 | 0.7 | 0.7 | 0 | 41.5 | 45500 | −28.5 |
| 45 | 0.40 | 0.60 | 0.7 | 0 | 0.7 | 41.7 | 46000 | −29.3 |

As is obvious from Tables 1 to 5, the dielectric ceramic composition of the invention has excellent characteristic properties such as a relative dielectric constant of larger than 40, an f$_0$Q value of not smaller than 33000, and $\tau_f$ falling within a range of ±50 ppm/° C. However, adding too much the additive(s) to the dielectric ceramic composition did not improve the characteristics of the dielectric ceramic composition.

The dielectric ceramic compositions of the invention have a high dielectric constant, increased unloaded Q and small temperature coefficient $\tau_f$ of resonance frequency.

While the invention has been described in detail and with reference to specific embodiments thereof, it will be apparent to one skilled in the art that various changes and modifications can be made therein without departing from the spirit and scope thereof.

What is claimed is:

1. A dielectric ceramic composition comprising a first compound having the general formula, aCaTiO$_3$—(1−a)Ca(Al$_{1/2}$Nb$_{1/2}$)O$_3$ in which 0.4≦a≦0.6.

2. The dielectric ceramic composition as claimed in claim 1, further comprising at least a second compound selected from the group consisting of zirconium oxide (ZrO$_2$), manganese oxide (MnO$_2$), and antimony trioxide (Sb$_2$O$_3$), with the second compound present in an amount no more than 2 parts by weight relative to 100 parts by weight of the first compound.

3. The dielectric ceramic composition as claimed in claim 2, wherein the second compound is zirconium oxide (ZrO$_2$).

4. The dielectric ceramic composition as claimed in claim 3, which contains from 0.2 to 2 parts by weight of the second compound relative to 100 parts by weight of the first compound.

5. The dielectric ceramic composition as claimed in claim 2, wherein the second compound is manganese oxide (MnO$_2$).

6. The dielectric ceramic composition as claimed in claim 4, which contains from 0.2 to 2 parts by weight of the second compound relative to 100 parts by weight of the first compound.

7. The dielectric ceramic composition as claimed in claim 2, wherein the second compound is antimony trioxide (Sb$_2$O$_3$).

8. The dielectric ceramic composition as claimed in claim 7, which contains from 0.2 to 2 parts by weight of the second compound relative to 100 parts by weight of the first compound.

9. A dielectric resonator for resonating in a region of resonant frequency between about 0.1 and 5 GHz comprising a dielectric ceramic composition of high dielectric constant and Q value having a first compound of the general formula aCaTiO$_3$—(1−a)Ca(Al$_{1/2}$Nb$_{1/2}$)O$_3$ in which 0.4≦a≦0.6 wherein the first compound provides a temperature coefficient of resonance frequency of between −50 ppm/° C. to +50 ppm/° C. for the dielectric ceramic composition.

10. A dielectric resonator as claimed in claim 9 further comprising a second compound selected from the group consisting of zirconium oxide (ZrO$_2$), manganese oxide (MnO$_2$), and antimony trioxide (Sb$_2$O$_3$) wherein the second compound is present in an amount no more than 2 parts by weight relative to 100 parts by weight of the first compound.

* * * * *